US012793879B2

(12) United States Patent
Syu et al.

(10) Patent No.: US 12,793,879 B2
(45) Date of Patent: Nov. 10, 2026

(54) FILTER STRUCTURE

(71) Applicant: LITE-ON TECHNOLOGY CORPORATION, Taipei City (TW)

(72) Inventors: Yong-Long Syu, Taipei City (TW); Kai-De Chen, Taipei City (TW); Chen Chen, Taipei City (TW)

(73) Assignee: LITE-ON TECHNOLOGY CORPORATION, Taipei City (TW)

( * ) Notice: Subject to any disclaimer, the term of this patent is extended or adjusted under 35 U.S.C. 154(b) by 140 days.

(21) Appl. No.: 18/830,655

(22) Filed: Sep. 11, 2024

(65) Prior Publication Data

US 2025/0273378 A1 Aug. 28, 2025

Related U.S. Application Data

(60) Provisional application No. 63/557,626, filed on Feb. 26, 2024.

(30) Foreign Application Priority Data

Aug. 20, 2024 (TW) ................................ 113131268

(51) Int. Cl.
*H01F 27/06* (2006.01)
*H01F 27/26* (2006.01)
*H01G 2/06* (2006.01)

(52) U.S. Cl.
CPC ........... *H01F 27/06* (2013.01); *H01F 27/266* (2013.01); *H01G 2/06* (2013.01)

(58) Field of Classification Search
CPC .......... H01F 27/06; H01F 27/266; H01G 2/06
See application file for complete search history.

(56) References Cited

U.S. PATENT DOCUMENTS 4,623,865 A * 11/1986 Kiesel ................... H01F 27/027 336/174
6,262,651 B1 * 7/2001 Miyamoto .............. H01F 27/29 336/198
6,480,088 B2 * 11/2002 Okamoto ................ H01F 37/00 336/84 R
11,849,537 B2 * 12/2023 Pardo Peris ........... H03H 7/427
2019/0180924 A1 * 6/2019 Lee ...................... H03H 7/1758

FOREIGN PATENT DOCUMENTS

TW 200612445 A 4/2006
TW 201929004 A 7/2019

OTHER PUBLICATIONS

Chinese language office action dated Nov. 12, 2025, issued in application No. TW 113131268.

* cited by examiner

*Primary Examiner* — Andrea Lindgren Baltzell
*Assistant Examiner* — Kimberly E Glenn
(74) *Attorney, Agent, or Firm* — McClure, Qualey & Rodack, LLP

(57) ABSTRACT

A filter structure is provided. The filter structure includes a substrate, a capacitor element, and a first choke element. The capacitor element and the first choke element are disposed on the substrate. The first choke element has a first ferrite core, two first windings wound around the first ferrite core, and a first magnetic conductive member. The first ferrite core is received in the first magnetic conductive member and located adjacent to the first choke element.

10 Claims, 8 Drawing Sheets

FILTER STRUCTURE

CROSS REFERENCE TO RELATED APPLICATIONS

This application claims the benefit of U.S. Provisional Patent Application No. 63/557,626, filed on Feb. 26, 2024, the entirety of which is incorporated by reference herein. This application claims priority of Taiwan Patent Application No. 113131268, filed on Aug. 20, 2024, the entirety of which is incorporated by reference herein.

BACKGROUND OF THE INVENTION

Field of the Invention

The present invention relates to filter structure, and, in particular, to a filter structure that has at least a magnetic conductive member.

Description of the Related Art

Traditional EMC filters can easily be affected by the limitations of their compact size and the mutual coupling effect between inductors and capacitors, which leads to problems such as a decrease in the filter's ability to suppress electromagnetic noise.

Currently, it is a common practice to increase the number of windings in a common-mode choke in the filter, and to suppress electromagnetic noise by increasing the inductance. However, this method may increase the DC resistance loss of the EMC filter and cause the filter's performance to degrade.

In view of this, it has become a challenge to design a filter structure that can have both a small size and high performance.

BRIEF SUMMARY OF THE INVENTION

To address the aforementioned problems, an embodiment of the present invention provides a filter structure that includes a substrate, a capacitor element, and a first choke element. The capacitor element and the first choke element are disposed on the substrate. The first choke element includes a first ferrite core, two first windings, and a first magnetic conductive member, and the first windings are wound around the first ferrite core. The first magnetic conductive member surrounds the first ferrite core and is located adjacent to the capacitor element.

In some embodiments, the filter structure further includes a second choke element disposed on the substrate, wherein the capacitor element is situated between the first choke element and the second choke element. The second choke element has a second ferrite core, two second windings and a second magnetic conductive member, and the second windings are wound around the second ferrite core, wherein the second magnetic conductive member surrounds the second ferrite core and is located adjacent to the capacitor element.

In some embodiments, a part of the first magnetic conductive member is located between the first windings.

In some embodiments, the substrate forms a plurality of first slots, and the first magnetic conductive member extends through the first slots.

In some embodiments, the first magnetic conductive member has a rectangular hollow structure.

An embodiment of the invention further provides a filter structure that includes a substrate, a capacitor element, and a first choke element. The capacitor element and the first choke element are disposed on the substrate. The first choke element includes a first ferrite core, two first windings and a first magnetic conductive member, the first windings are wound around the first ferrite core, and the first ferrite core is situated in the first magnetic conductive member. The first magnetic conductive member is located adjacent to the capacitor element and forms a first opening.

In some embodiments, the first magnetic conductive member has a U-shaped structure, and the first opening and the substrate are located on opposite sides of the first ferrite core.

In some embodiments, the first magnetic conductive member has an inverted U-shaped structure, and the first opening faces the substrate.

In some embodiments, the filter structure further includes a second choke element disposed on the substrate, wherein the capacitor element is situated between the first and second choke elements, and the second choke element has a second ferrite core, two second windings and a second magnetic conductive member. The second windings are wound around the second ferrite core, the second ferrite core is situated in the second magnetic conductive member, and the second magnetic conductive member is located adjacent to the capacitor element and forms a second opening.

In some embodiments, the first magnetic conductive member and the second magnetic conductive member both have a C-shaped structure, and the first and second openings face opposite directions.

An embodiment of the invention further provides a filter structure that includes a substrate, a capacitor element, and a first choke element. The capacitor element and the first choke element are disposed on the substrate and located adjacent to the capacitor element. The first choke element includes an annular first ferrite core, two first windings and a first magnetic conductive member, the first ferrite core forms a first through hole, the first windings are wound around the first ferrite core, and the first magnetic conductive member is disposed on the first ferrite core. At least a part of the first through hole is covered by the first magnetic conductive member.

In some embodiments, the projections of the capacitive element and the first ferrite core on a plane perpendicular to the central axis of the first through hole at least partially overlap.

In some embodiments, the first magnetic conductive member contacts the first ferrite core, wherein a gap is formed between the first ferrite core and each of the first windings.

In some embodiments, the first magnetic conductive member has a first section situated between the first ferrite core and the capacitive element.

In some embodiments, the first magnetic conductive member further has a second section connected to and bent relative to the first section.

In some embodiments, the first magnetic conductive member further has a third section disposed on the substrate, and the first section is connected between the second and third sections.

In some embodiments, the filter structure further includes a second choke element disposed on the substrate, wherein the second choke element has an annular second ferrite core, two second windings and a second magnetic conductive member. The second ferrite core forms a second through hole, the second windings are wound around the second ferrite core, and the second magnetic conductive member is disposed on the second ferrite core. At least a part of the second through hole is covered by the second magnetic conductive member.

In some embodiments, the first choke element, the capacitor element, and the second choke element are sequentially arranged along the central axis of the first through hole.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the filter structure are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
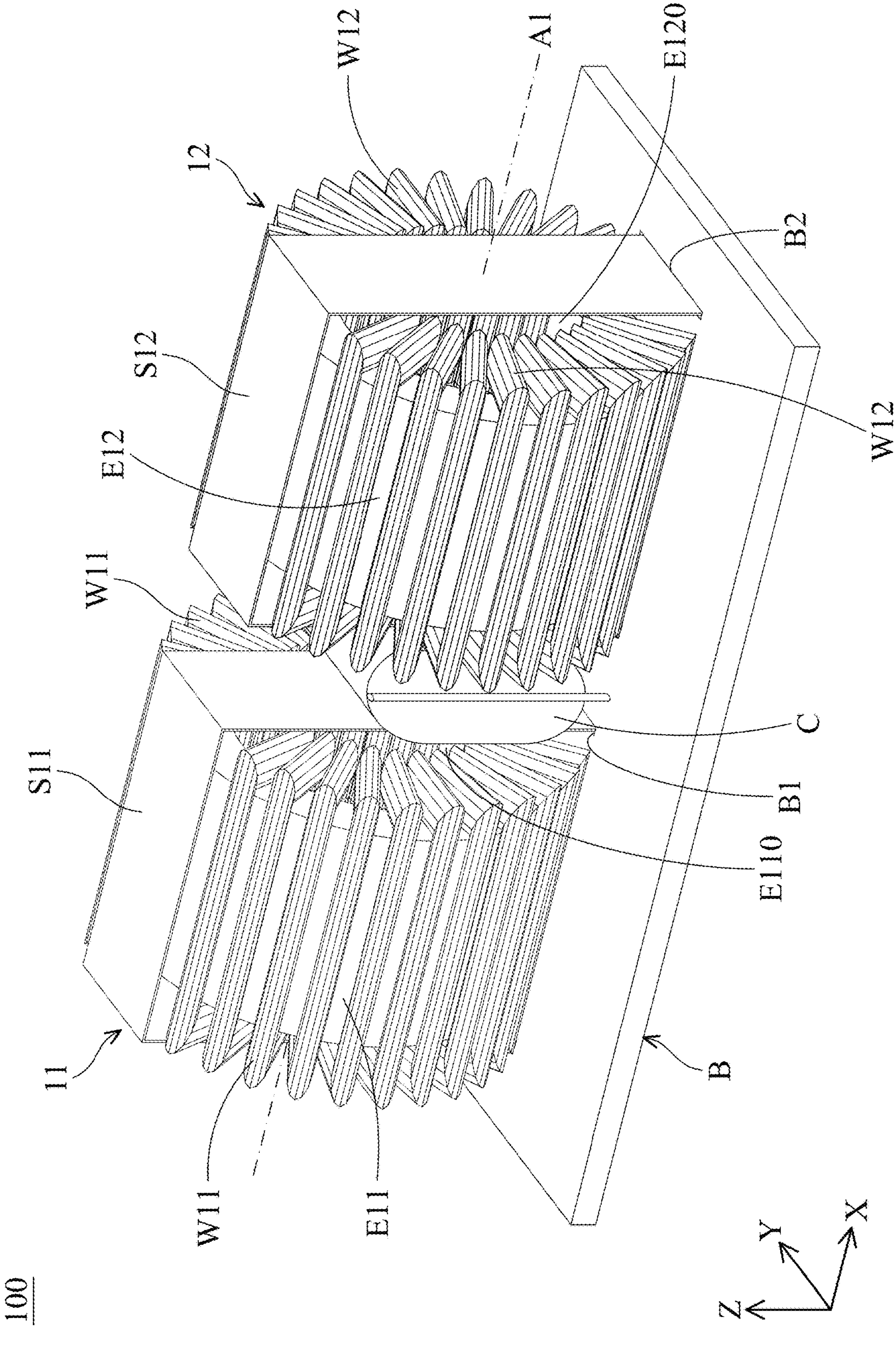
FIG. 1 shows a perspective diagram of a filter structure 100 in accordance with an embodiment of the invention.
Figure 2:
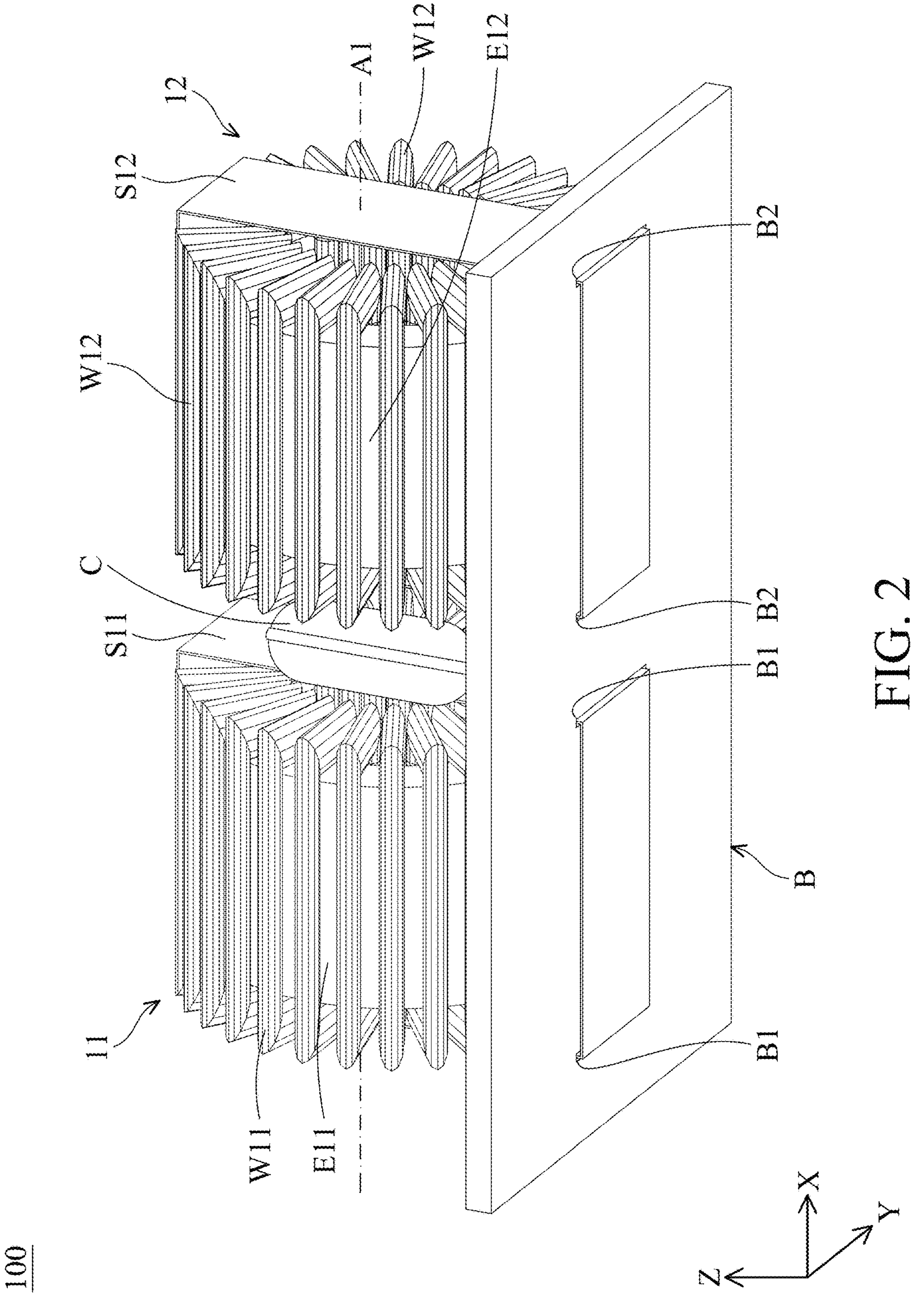
FIG. 2 shows another perspective diagram of the filter structure 100 in FIG. 1.
Figure 3:
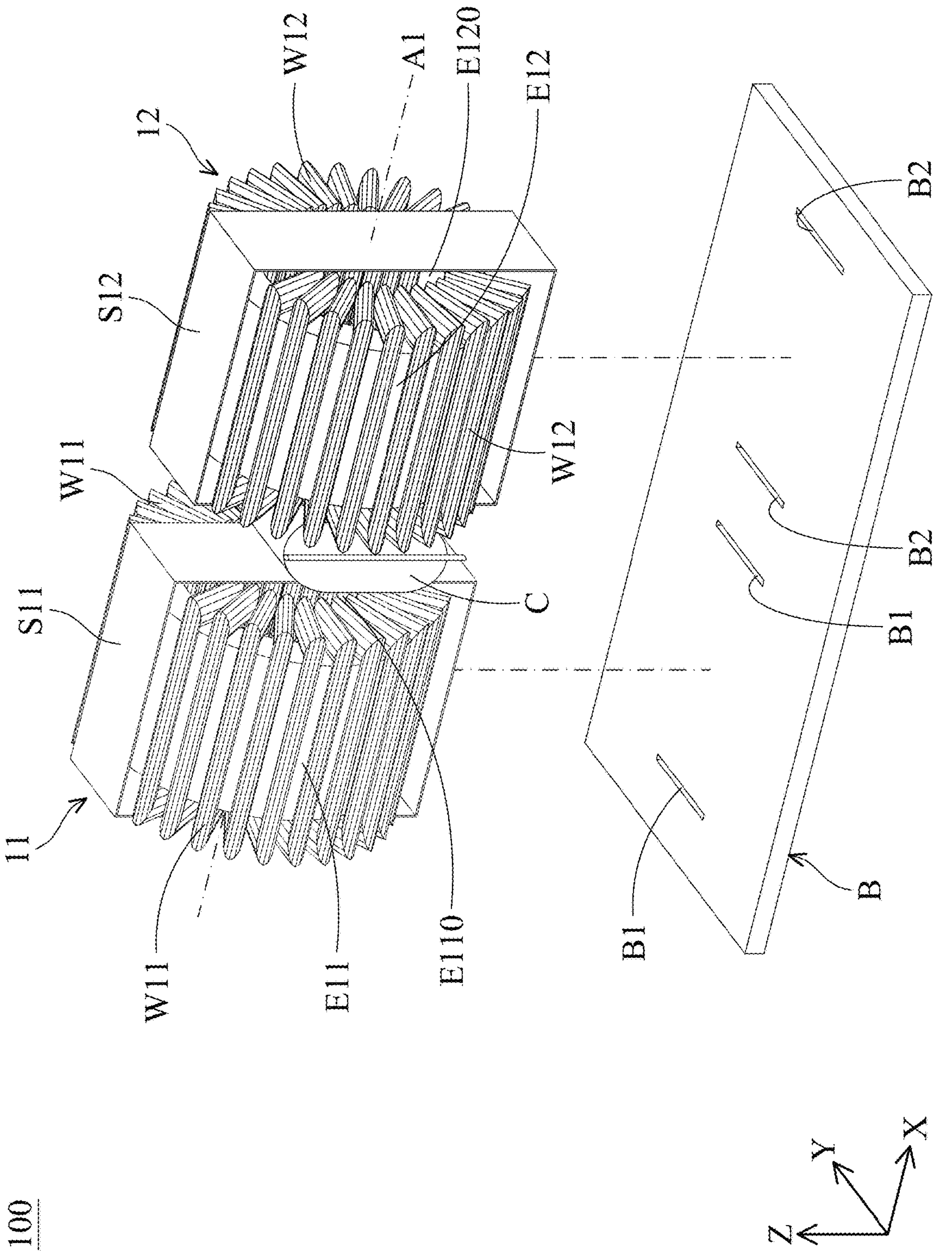
FIG. 3 shows an exploded view of the filter structure 100 in FIGS. 1 and 2.

FIG. 1 shows a perspective diagram of a filter structure 100 in accordance with an embodiment of the invention. FIG. 2 shows another perspective diagram of the filter structure 100 in FIG. 1. FIG. 3 shows an exploded view of the filter structure 100 in FIGS. 1 and 2.

Referring to FIGS. 1-3, the filter structure 100 may comprise an EMC filter that can be disposed in a circuit system of a charging pile, energy storage equipment, computer, server, or adapter.

In this embodiment, the filter structure 100 primarily includes a substrate B, a first choke element 11, a second choke element 12, and a capacitor element C. The substrate B may comprise a printed circuit board (PCB). Additionally, the first choke element 11, the second choke element 12, and the capacitor element C are disposed on the substrate B, wherein the first and second choke elements 11 and 12 are used as a common-mode chock filter.

It should be noted that the capacitor element C is positioned between the first choke element 11 and the second choke element 12. The first choke element 11, the second choke element 12, and the capacitor element C are electrically connected to each other via the conductors of the substrate B to form an EMC filter circuit.

As shown in FIGS. 1-3, the first choke element 11 primarily includes an annular first ferrite core E11, two symmetrical first windings W11 and a first magnetic conductive member S11, wherein the first windings W11 are wound around the first ferrite core E11 and electrically connected to the substrate B. Moreover, the first magnetic conductive member S11 has a rectangular hollow structure and surrounds the first ferrite core E11. In particular, a part of the first magnetic conductive member S11 is situated between the two first windings W11, and the capacitive element C is located adjacent to the first magnetic conductive member S11.

In this embodiment, the first ferrite core E11 has a first through hole E110. The first magnetic conductive member S11 is disposed on the first ferrite core E11 and covers at least a part of the first through hole E110.

Similarly, the second choke element 12 primarily includes an annular second ferrite core E12, two symmetrical second windings W12 and a second magnetic conductive member S12, wherein the second windings W12 are wound around the second ferrite core E12 and electrically connected to the substrate B. The second magnetic conductive member S12 has a rectangular hollow structure and surrounds the second ferrite core E12. A part of the second magnetic conductive member S12 is situated between the two second windings W12, and the capacitive element C is located adjacent to the second magnetic conductive member S12.

In this embodiment, the second ferrite core E12 has a second through hole E120. The second magnetic conductive member S12 is disposed on the second ferrite core E12 and covers at least a part of the second through hole E120.

The substrate B is located below the first and second ferrite cores E11 and E12. Two elongated first slots B1 and two elongated second slots B2 are formed on the substrate B. Specifically, the first magnetic conductive member S11 extends through the first slots B1, and the second magnetic conductive member S12 extends through the second slots B2, whereby the first magnetic conductive member S11 and the second magnetic conductive member S12 are fixed to the substrate B. Here, the capacitive element C is located between the first magnetic conductive member S11 and the second magnetic conductive member S12 along the X axis.

For example, the first magnetic conductive member S11 and the second magnetic conductive member S12 are both magnetic conductive plates with high magnetic permeability. The first and second magnetic conductive members S11 and S12 may comprise nanocrystalline material, but they are not limited to those disclosed in each embodiment of the invention.

With the first magnetic conductive member S11 and the second magnetic conductive member S12 respectively disposed in the first choke element 11 and the second choke element 12, coupling noise effect between the windings or between the windings and the capacitor can be significantly reduced. Moreover, the leakage inductance of the common-mode choke circuit can be greatly increased, thereby reducing the loss of the EMC filter and improving the performance of the filter structure 100.

In particular, the first choke element 11, the capacitor element C and the second choke element 12 in this embodiment are sequentially arranged along the central axis A1 (X direction) of the first through hole E110 and the second through hole E120. It should be noted that the projections of the capacitive element C, the first ferrite core E11, and the second ferrite core E12 on a plane perpendicular to the central axis A1 (X direction) at least partially overlap. Therefore, the performance of the filter structure 100 can be improved, and space utilization of the filter structure 100 can also be increased to achieve miniaturization of the product.

In some embodiments, the top portion of the first magnetic conductive member S11 may contact the first ferrite core E11, and a gap is formed between the first magnetic conductive member S11 and each of the two first windings W11. Namely, the first magnetic conductive member S11 contacts the first ferrite core E11, but does not contact the first windings W11. Similarly, the top portion of the second magnetic conductive member S12 may contact the second ferrite core E12, and a gap is formed between the magnetic component S12 and each of the two second windings W12. Namely, the second magnetic conductive component S12 contacts the second ferrite core E12, but does not contact the second winding W12.

In some embodiments, the second choke element 12 may be omitted from the filter structure 100, and only the first choke element 11 and the capacitor element C are disposed on the substrate B. However, the configuration of the filter structure 100 is not limited to those disclosed in the embodiments of the invention.

Figure 4:
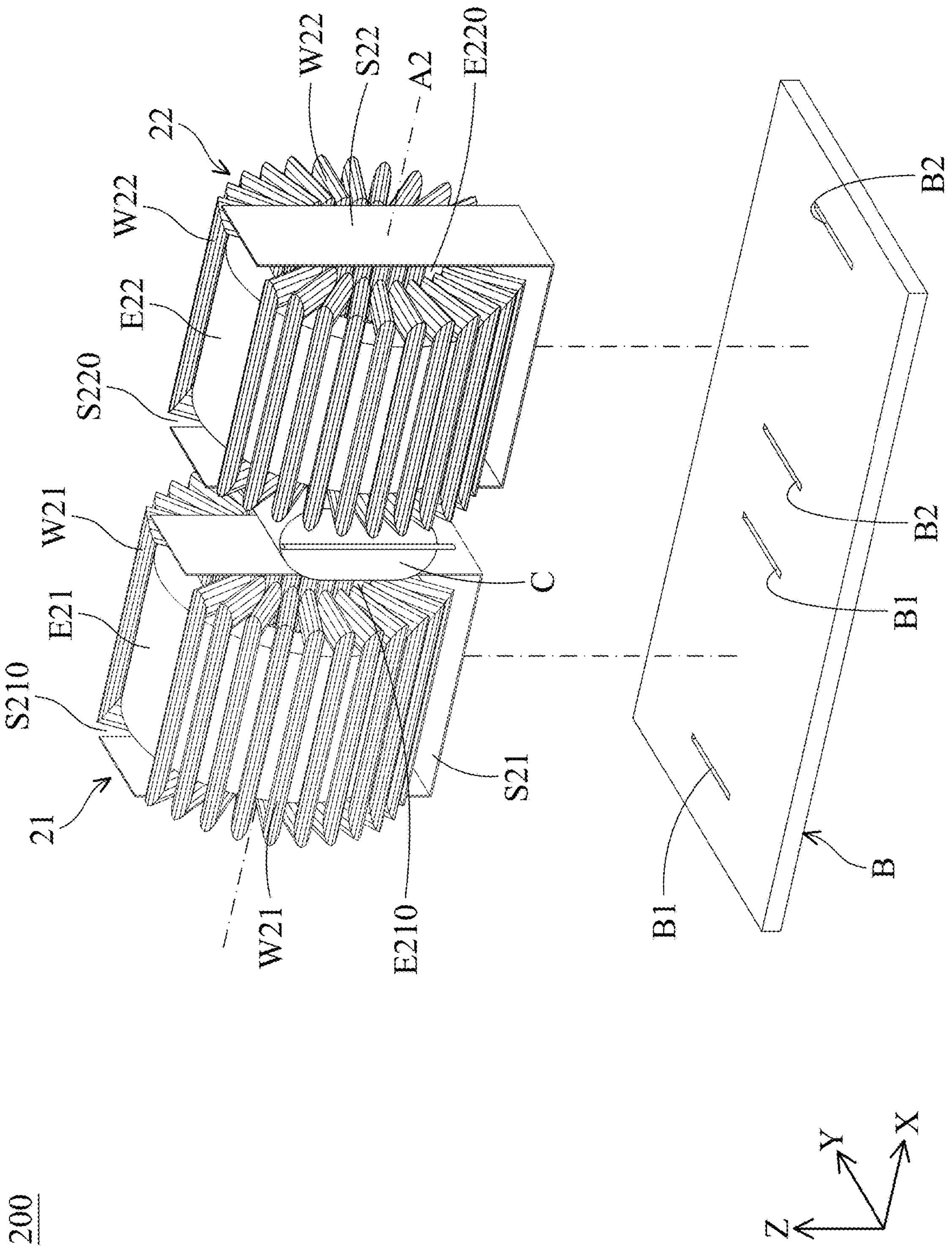
FIG. 4 shows an exploded view of a filter structure 200 in accordance with another embodiment of the invention.

FIG. 4 shows an exploded view of a filter structure 200 in accordance with another embodiment of the invention. Additionally, FIG. 5 is a perspective diagram of the filter structure 200 in FIG. 4, and FIG. 6 is another perspective diagram of the filter structure 200 in FIG. 5.

Figure 5:
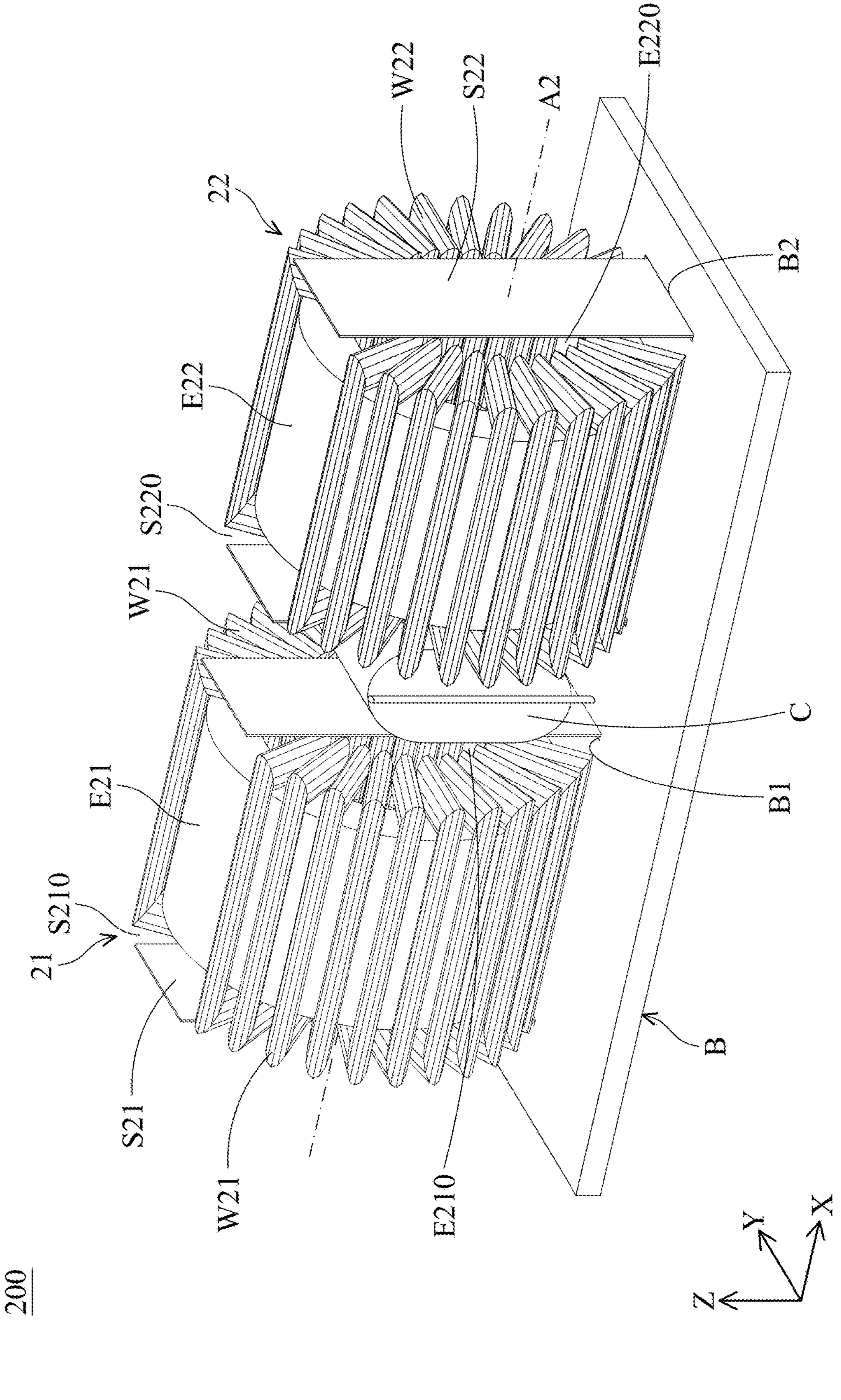
FIG. 5 is a perspective diagram of the filter structure 200 in FIG. 4.
Figure 6:
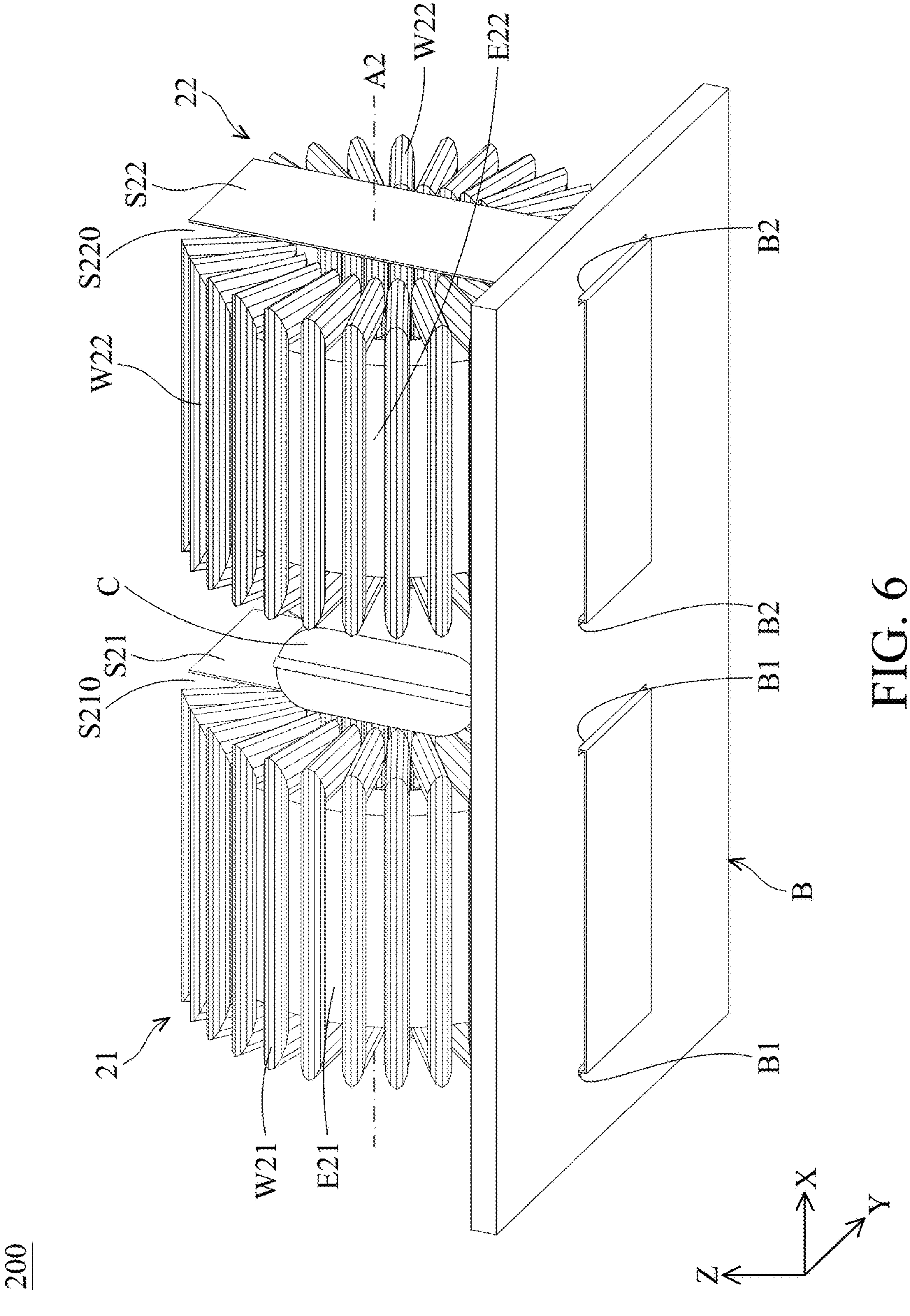
FIG. 6 is another perspective diagram of the filter structure 200 in FIG. 5.

As shown in FIGS. 4, 5, and 6, the filter structure 200 is different from the filter structure 100 of FIGS. 1 to 3 in that the first magnetic conductive element S21 of the first choke element 21 and the second magnetic conductive element S22 of the second choke element 22 both have a U-shaped structure. Here, the first magnetic conductive element S21 forms a first opening S210 facing the Z direction, and the second magnetic conductive member S22 forms a second opening S220 facing the Z direction. That is, the first opening S210 and the second opening S220 face the same direction.

In this embodiment, the first choke element 21, the capacitor element C and the second choke element 22 are sequentially arranged along the central axis A2 of the first and second through holes E210 and E220. The annular first ferrite core E21 is received in the U-shaped first magnetic conductive member S21, the annular second ferrite core E22 is received in the U-shaped second magnetic conductive member S22, and the capacitive element C is disposed between the first conductive member S21 and the second magnetic conductive member S22.

In addition, the first opening S210 of the first magnetic conductive member S21 is located adjacent to the top side of the first ferrite core E21, the second opening S220 of the second magnetic conductive member S22 is located adjacent to the top side of the second ferrite core E22, and the substrate B is situated on the bottom side of the first and second ferrite cores E11 and E22. That is, the first opening S210, the second opening S220, and the substrate B are located on opposite sides of the first and second ferrite cores E21 and E22.

With the first magnetic conductive member S21 and the second magnetic conductive member S22 respectively disposed in the first choke element 21 and the second choke element 22, coupling noise effect between the capacitor element C and the first and the second windings W21 and W22 can be significantly reduced, whereby the performance of the filter structure 100 can be improved. Moreover, with the first opening S210 and the second opening S220 respectively formed on the top side of the first and second magnetic conductive members S21 and S22, the size and height of the filter structure 200 along the Z axis can be effectively reduced, thereby saving costs and achieving miniaturization of the product.

In some embodiments, the second choke element 22 may be omitted from the filter structure 200, and only the first choke element 21 and the capacitor element C are disposed on the substrate B. However, the configuration of the filter structure 200 is not limited to those disclosed in the embodiments of the invention.

Figure 7:
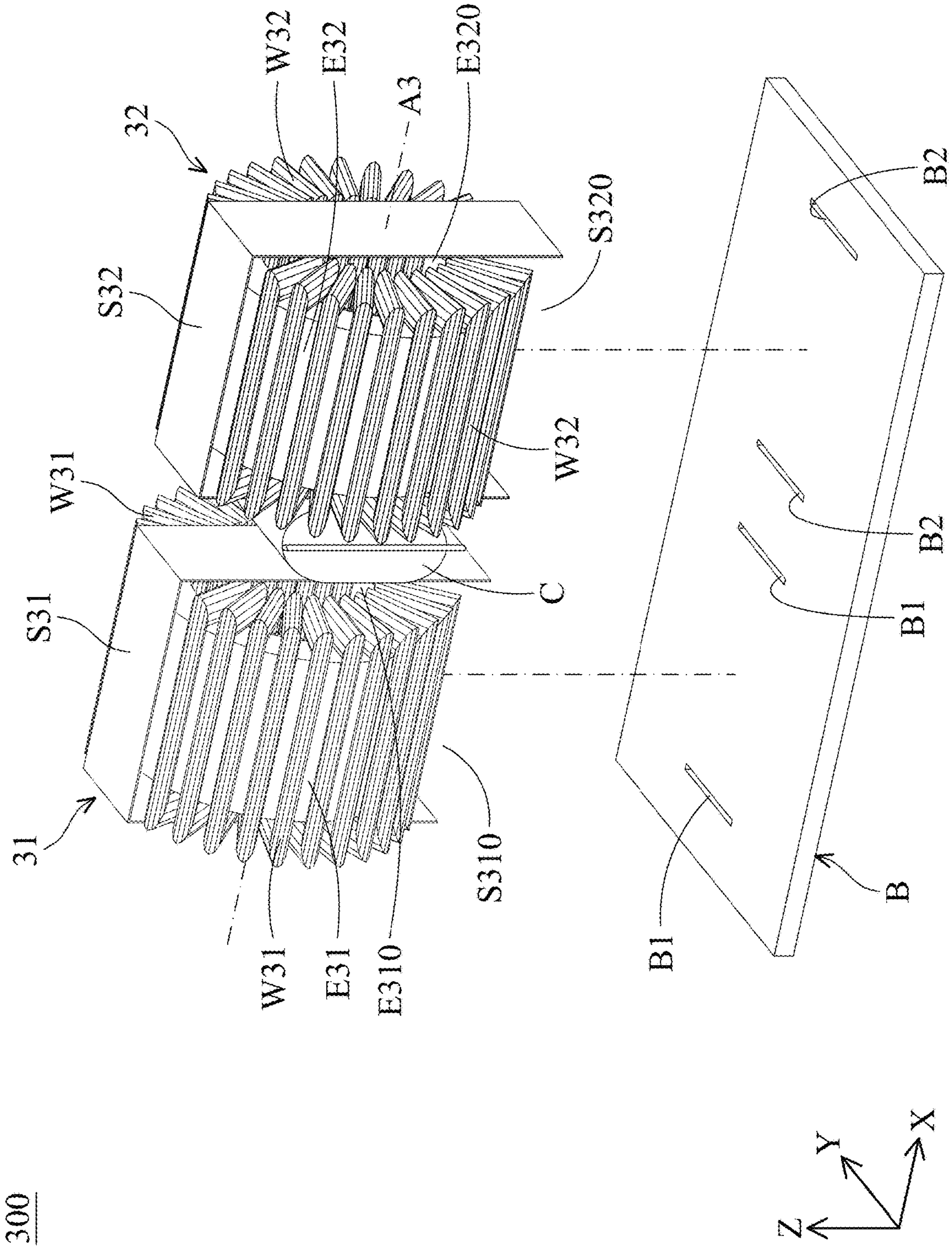
FIG. 7 shows an exploded view of a filter structure 300 in accordance with another embodiment of the invention.

FIG. 7 shows an exploded view of a filter structure 300 in accordance with another embodiment of the invention. As shown in FIG. 7, the filter structure 300 is different from the filter structure 200 of FIGS. 4 to 6 in that the first magnetic conductive element S31 of the first choke element 31 and the second magnetic conductive element S32 of the second choke element 32 both have an inverted U-shaped structure. Here, the first magnetic conductive element S31 forms a first opening S310 facing the −Z direction, and the second magnetic conductive member S32 forms a second opening S320 facing the −Z direction. That is, the first opening S310 and the second opening S320 face the same direction.

In this embodiment, the first choke element 31, the capacitance element C and the second choke element 32 are sequentially arranged along the central axis A3 of the first and second through holes E310 and E320. The annular first ferrite core E31 is received in the first magnetic conductive member S31, and the annular second ferrite core E32 is received in the second magnetic conductive member S32. Both ends of the first magnetic conductive member S31 can be engaged in the first slots B1 of the substrate B after assembly, and both ends of the second magnetic conductive member S32 can be engaged in the second slots B2 of the substrate B after assembly.

Additionally, it can be seen in FIG. 7 that the first opening S310 of the first magnetic conductive member S31 faces the substrate B, the second opening S320 of the second magnetic conductive member S32 also faces the substrate B, and the capacitive element C is located between the first magnetic conductive part S31 and the second magnetic conductive part S32 along the X axis.

In this embodiment, with the inverted U-shaped first and second magnetic conductive members S31 and S32, coupling noise effect between the capacitor element C and the first and the second windings W31 and W32 can be significantly suppressed, and the loss of the EMC filter can also be reduced. Therefore, the performance of the filter structure 300 can be efficiently improved. Moreover, with the first and second openings S310 and S320 formed on the bottom side of the first and second magnetic conductive members S31 and S32, the size and height of the filter structure 300 along the Z axis can be reduced, thereby saving costs and achieving miniaturization of the product.

In some embodiments, the second choke element 32 may be omitted from the filter structure 300, and only the first choke element 31 and the capacitor element C are disposed on the substrate B. However, the configuration of the filter structure 300 is not limited to those disclosed in the embodiments of the invention.

Figure 8:
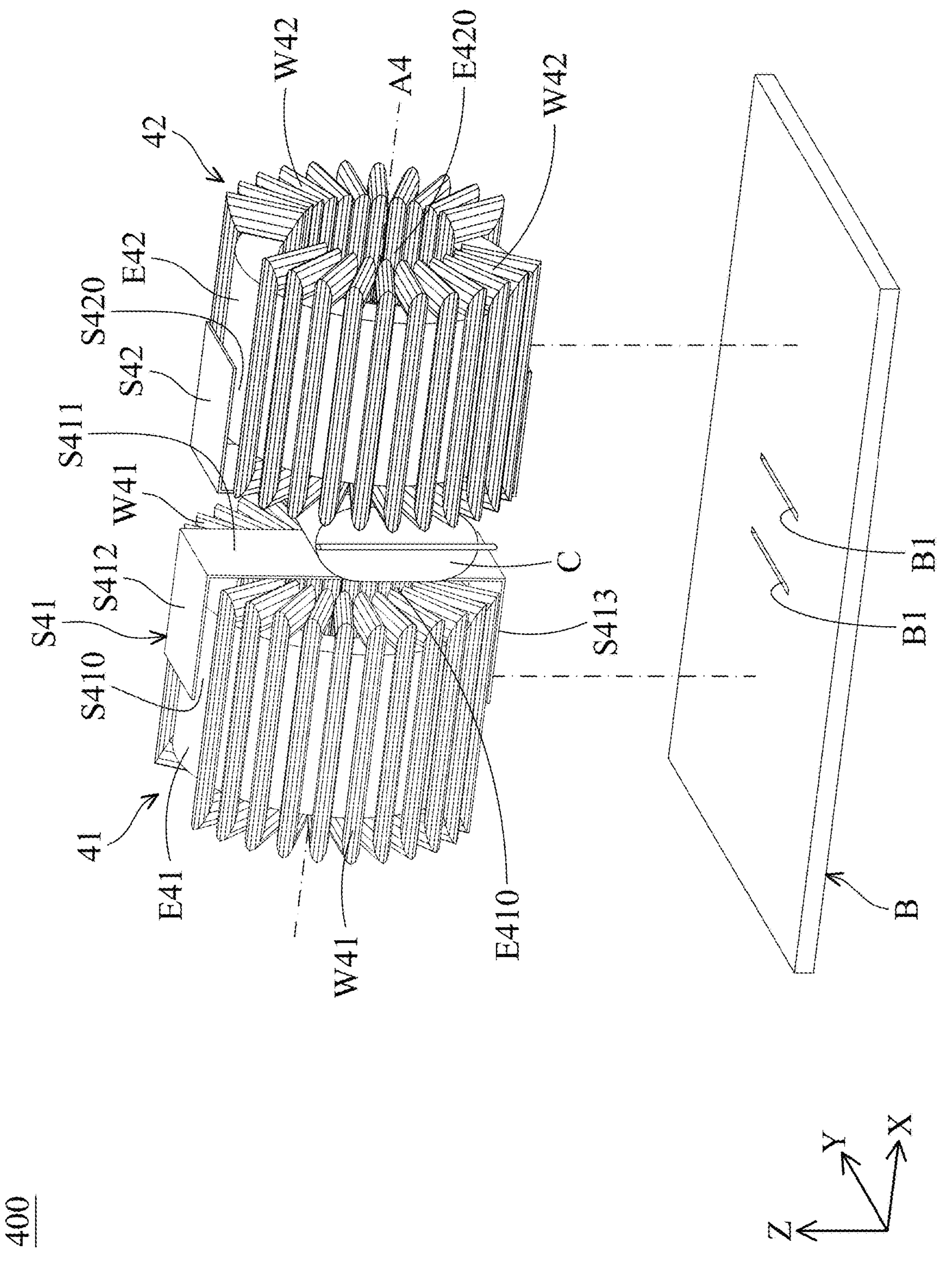
FIG. 8 shows a perspective view of a filter structure 400 in accordance with another embodiment of the invention.

FIG. 8 shows a perspective view of a filter structure 400 in accordance with another embodiment of the invention. As shown in FIG. 8, the filter structure 400 is different from the filter structure 300 of FIG. 7 in that the first magnetic conductive element S41 of the first choke element 41 and the second magnetic conductive element S42 of the second choke element 42 both have a C-shaped structure.

Here, the first magnetic conductive element S41 forms a first opening S410 facing the −X direction, and the second magnetic conductive member S42 forms a second opening S420 facing the X direction. That is, the first opening S410 and the second opening S420 face opposite directions.

In this embodiment, the first choke element 41, the capacitor element C and the second choke element 42 are sequentially arranged along the central axis A4 of the first and second through holes E410 and E420. In this configuration, the annular first ferrite core E41 is partially received in the C-shaped first magnetic conductive member S41, and a part of the first ferrite core E41 protrudes from the first opening S410 of the first magnetic conductive member S41 in the −X direction. Similarly, the annular second ferrite core E42 is partially received in the C-shaped second magnetic conductive member S42, and a part of the second ferrite core E42 protrudes from the second opening S420 of the second magnetic conductive member S42 in the X direction.

Moreover, it can be seen in FIG. 8 that the first magnetic conductive member S41 has a first section S411, a second section S412 and a third section S413 connected to each other. The first section S411 of the first magnetic conductive member S41 is located between the first ferrite core E41 and the capacitive element C along the X axis. The second section S412 of the first magnetic conductive member S41 is bent relative to the first section S411 and located on the top side of the first ferrite core E41. The third section S413 of the first magnetic conductive member S41 is bent relative to the first section S411, affixed to the substrate B, and situated on the bottom side of the first ferrite core E41. As the first and second magnetic conductive members S41 and S42 have symmetrical structures, the second magnetic conductive member S42 will not be described again here for simplification of the disclosure.

In this embodiment, the capacitive element C is located between the first magnetic conductive member S41 and the second magnetic conductive member S42 along the X axis, and a first slot B1 and a second slot B2 are formed on the substrate B. During assembly, the first magnetic conductive member S41 can be inserted through the first slot B1 on the substrate B, and the second magnetic conductive member S42 can be inserted through the second slot B2 on the substrate B, whereby the first magnetic conductive member S41 and the second magnetic conductive member S42 are firmly affixed to the substrate B.

With the first magnetic conductive member S41 and the second magnetic conductive member S42 respectively disposed in the first choke element 41 and the second choke element 42, coupling noise effect between the capacitor element C and the first and the second windings W41 and W42 can be significantly suppressed. Therefore, the loss of the EMC filter can be reduced, and the performance of the filter structure 400 can be efficiently improved. Moreover, with the first opening S410 formed on the left side of the first magnetic conductive members S41 and the second opening S420 formed on the right side of the second magnetic conductive member S42, the size and height of the filter structure 400 along the X axis can be reduced, thereby saving costs and achieving miniaturization of the product.

In some embodiments, the second choke element 42 may be omitted from the filter structure 400, and only the first choke element 41 and the capacitor element C are disposed on the substrate B, However, the configuration of the filter structure 400 is not limited to those disclosed in the embodiments of the invention.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A filter structure, comprising:

a substrate;

a capacitor element, disposed on the substrate; and a first choke element, disposed on the substrate, wherein the first choke element comprises a first ferrite core, two first windings and a first magnetic conductive member, the first windings are wound around the first ferrite core, and the first ferrite core is situated in the first magnetic conductive member, wherein the first magnetic conductive member is located adjacent to the capacitor element and forms a first opening;

wherein the first magnetic conductive member has an inverted U-shaped structure, and the first opening faces the substrate.

2. The filter structure as claimed in claim 1, further comprising a second choke element disposed on the substrate, wherein the capacitor element is situated between the first and second choke elements, and the second choke element has a second ferrite core, two second windings and a second magnetic conductive member, wherein the second windings are wound around the second ferrite core, the second ferrite core is situated in the second magnetic conductive member, and the second magnetic conductive member is located adjacent to the capacitor element and forms a second opening.

3. The filter structure as claimed in claim 2, wherein the first magnetic conductive member and the second magnetic conductive member both have a C-shaped structure, and the first and second openings face opposite directions.

4. A filter structure, comprising:

a substrate;

a capacitor element, disposed on the substrate; and a first choke element, disposed on the substrate and located adjacent to the capacitor element, wherein the first choke element comprises an annular first ferrite core, two first windings and a first magnetic conductive member, the first ferrite core forms a first through hole, the first windings are wound around the first ferrite core, and the first magnetic conductive member is disposed on the first ferrite core, wherein at least a part of the first through hole is covered by the first magnetic conductive member;

wherein the first magnetic conductive member contacts the first ferrite core, and a gap is formed between the first ferrite core and each of the first windings.

5. The filter structure as claimed in claim 4, wherein the projections of the capacitive element and the first ferrite core on a plane perpendicular to the central axis of the first through hole at least partially overlap.

6. The filter structure as claimed in claim 4, wherein the first magnetic conductive member has a first section situated between the first ferrite core and the capacitive element.

7. The filter structure as claimed in claim 6, wherein the first magnetic conductive member further has a second section connected to and bent relative to the first section.

8. The filter structure as claimed in claim 7, wherein the first magnetic conductive member further has a third section disposed on the substrate, and the first section is connected between the second and third sections.

9. The filter structure as claimed in claim 4, further comprising a second choke element disposed on the substrate, wherein the second choke element has an annular second ferrite core, two second windings and a second magnetic conductive member, the second ferrite core forms a second through hole, the second windings are wound around the second ferrite core, and the second magnetic conductive member is disposed on the second ferrite core, wherein at least a part of the second through hole is covered by the second magnetic conductive member.

10. The filter structure as claimed in claim 9, wherein the first choke element, the capacitor element, and the second choke element are arranged along the central axis of the first through hole.

* * * * *